Patented June 15, 1937

2,083,877

UNITED STATES PATENT OFFICE 2,083,877

DEHYDROGENATION OF ALCOHOLS

Leo V. Steck, Piedmont, William Engs and Martin de Simó, Berkeley, Calif., assignors to Shell Development Company, San Francisco, Calif., a corporation of Delaware No Drawing. Application September 18, 1935, Serial No. 41,136

20 Claims. (Cl. 260—134)

This invention relates to a process for the catalytic dehydrogenation of alcohols and it more particularly relates to a process for the conversion of primary and secondary alcohols, preferably such monohydric alcohols containing at least three carbon atoms to the molecule, primarily to the corresponding carbonylic compounds of the class consisting of aldehydes and ketones. The process of the invention is characterized in that the alcohol to be dehydrogenated is subjected to the action of a dehydrogenation catalyst essentially comprising an active metal under a pressure substantially greater than one atmosphere.

This invention has as an object to provide a practical and economical method for the technical scale production of aldehydes and/or ketones and mixtures containing one or more of such carbonylic compounds, suitable for use as solvents and for many other purposes, by catalytic dehydrogenation of alcohols of the type herein described under elevated pressures, whereby numerous material and economic advantages over the known methods of producing aldehydes and ketones are realized.

It is well known that alcohols may be subjected to the action of various catalysts and dehydrogenated to aldehydes and ketones, and that numerous processes have been devised to accomplish said purpose. Numerous obstacles have thus far prevented the development of a completely successful commercial process.

Some of these difficulties may be briefly indicated as follows: When the more volatile aldehydes or ketones are prepared by dehydrogenation, the effluent hydrogen carries with it prohibitive quantities of product which are difficult to recover efficiently therefrom by the conventional condensation and scrubbing operations unless such operations are conducted under elevated pressures. Hence, by the known methods, if material losses of aldehydes or ketones of high vapor pressure, as acetone, are to be avoided, it is almost essential that the hydrogen discharged from the dehydrogenation unit be compressed in order that the condensation and scrubbing may be effected under pressure. The dehydrogenation reaction has heretofore been effected at pressures not greater than one atmosphere because of the fact that, since the reaction is accompanied by a substantial increase in volume, it would be expected that substantially elevated pressures would have a decided deleterious effect on the rate and extent of conversion. When the dehydrogenation is effected under atmospheric pressures, the hydrogen obtained as a by-product in the reaction is discharged from the system at atmospheric pressure. If such hydrogen is to be utilized, it is convenient that it be compressed. This compression step involves the installation and maintenance of costly compression equipment. As a consequence, the hydrogen produced in accordance with the known dehydrogenation methods is either used for fuel or discarded, thus materially increasing the production costs.

Now we have found that by operation in accordance with the principles of the present invention, we overcome the difficulties of the known methods and effect the production of aldehydes and ketones in a very facile and economical manner.

We have found that the decrease in conversion of the alcohols due to the increase in pressure of operation is small when the dehydrogenation is effected in the presence of a catalyst essentially comprising an active metal at a temperature at which the rate of reaction is relatively high. For example, in the dehydrogenation of isopropyl alcohol to acetone in the presence of a brass catalyst at about 500° C., there was only about a 5.1% decrease in equilibrium conversion (from about 99.9% to about 94.8%) when the pressure in the system was increased from about one atmosphere to about fifty atmospheres. This decrease in conversion was more than offset by the practical advantages of operating at the higher pressure.

When operating in accordance with the process, the hydrogen formed in the course of the reaction may be discharged from the system in a state of compression. While under compression, said hydrogen may be conveniently discharged into suitable containers and stored or it may, if desired, be conducted to other units for utilization therein. For example, the hydrogen, under substantially the pressure at which it is produced in the dehydrogenation process, may be conducted to a hydrogenating unit wherein hydrogen is required under pressure, thus eliminating the step of compressing the hydrogen prior to its use. In this manner, substantially all of the hydrogen can be utilized in other processes or for other purposes requiring compressed hydrogen without the necessity of installing and maintaining costly compression equipment.

Further, we have found that the volatile organic reaction products and unreacted alcohol can be recovered from the hydrogen produced in a much more economical and facile manner by operating in accordance with our invention. If the material leaving the reaction zone under a pressure substantially greater than atmospheric is cooled in a condenser or other suitable cooling device while under pressure, a much more complete separation of condensable materials can be effected. If subsequent to the primary condensation, the effluent hydrogen is scrubbed with a suitable solvent while under a pressure substantially greater than atmospheric, substantially complete recovery of the organic reaction product and the unreacted alcohol, if any is present, may be effected in a more economical manner since less absorbent liquid and a smaller scrubbing unit will be required than if said operation were effected under ordinary pressure. As an example of this advantageous feature, reference is had to the dehydrogenation of isopropyl alcohol to acetone. The material leaving the reaction tube is conducted to a condenser coil cooled with water wherein the major portion of the acetone and unreacted alcohol is separated from the hydrogen by condensation. The gaseous material leaving the condenser is conducted to a suitable scrubbing tower or column and scrubbed with water for the recovery of the remainder of the acetone and alcohol carried over in the vapor phase with the hydrogen. When the cooling and scrubbing operations are effected at atmospheric pressure, the hydrogen leaving the condenser stage carries with it about 584 mols of acetone per 1000 mols of hydrogen. Substantially complete recovery of this acetone in a subsequent scrubbing operation requires about 0.7 lb. of water per pound of total acetone produced, and 5 theoretical plates in the scrubber. When the initial cooling and scrubbing operations are effected at a pressure of about 3 atmospheres (absolute), with other conditions the same, the hydrogen leaving the condenser unit carries with it only about 140 mols of acetone per 1000 mols of hydrogen, the subsequent scrubbing requires only about 0.2 lb. of water per pound of total acetone produced, and only 2.3 theoretical plates are required in the scrubber. Since the acetone is recovered from the scrubbing water by distillation, operation under the superatmospheric pressure saves the handling of about 3300 lbs. of water per 1000 gallons of acetone produced.

The hydrogen formed in the process of dehydrogenating alcohols under elevated pressures in accordance with the invention appears to be very pure, so that it can be obtained in a compressed state and used directly for practically all purposes for which pure hydrogen is required.

The alcohols to which the invention is particularly applicable are the monohydric primary and secondary alcohols which possess at least three carbon atoms to the molecule. Such alcohols may be readily converted in good yields to the corresponding aldehydes or ketones under elevated pressures and at temperatures and contact times at which substantially no esters are formed and other undesirable side reactions involving reactants and products are substantially obviated. Ethyl alcohol is excluded from the group of suitable alcohols due to the fact that prohibitive amounts of condensation products and esters are formed when this compound is dehydrogenated under elevated pressures at temperatures at which reaction occurs at a practical rate. A preferred group of monohydric alcohols includes the primary and secondary alcohols of aliphatic, aralkyl and alicyclic character. As examples of suitable aliphatic alcohols we may employ the following: propyl alcohol, isopropyl alcohol, normal butyl alcohol, isobutyl alcohol, secondary butyl alcohol, the primary and secondary amyl, hexyl, heptyl, octyl and the like alcohols and their homologues, analogues and suitable substitution products. As representative of suitable aralkyl and cyclic alcohols, we may dehydrogenate benzyl alcohol and its homologues, analogues and substitution products, borneol, isoborneol, cyclohexanol, fenchyl alcohol and the like. In some cases, we may treat unsaturated monohydric primary and secondary alcohols and obtain the corresponding aldehydes or ketones. The primary alcohols are dehydrogenated to the corresponding aldehydes containing the same number of carbon atoms to the molecule, while the secondary alcohols are dehydrogenated primarily to the corresponding ketones, for example, propyl alcohol to propionaldehyde, normal butyl alcohol to n-butyraldehyde, isopropyl alcohol to acetone, secondary butyl alcohol to methyl ethyl ketone, isoborneol to camphor, cyclohexanol to cyclohexanone, fenchyl alcohol to fenchone, etc. The alcohols may be employed severally or mixtures comprising more than one species may be treated and mixed products obtained.

The invention is preferably executed in the presence of a catalyst essentially comprising one or more active metals. Suitable catalysts include, among others, those comprising one or a plurality of heavy metals selected from groups 1, 2, 7 and 8 of the periodic system, as manganese, copper, silver, gold, zinc, cadmium, iron, cobalt, nickel, platinum, irridium, osmium, ruthenium and rhodium. The catalysts may be prepared by any suitable method and employed severally or in mixtures. The metals may be used in mixtures with other dehydrogenation catalysts as difficultly reducible metal oxides as manganese oxide, zinc oxide, etc., and/or other catalytic metal compounds as the metal chromites, phosphates, tungstates, molybdates, selenates, selenites, etc. The metallic catalysts may be preformed and used per se in any convenient form or they may be deposited upon or incorporated with a suitable inert substance or carrier such as pumice, calcium carbonate, diatomaceous earth, clay, silica gel, charcoal and the like. In many cases, the activity of a particular catalyst may be enhanced by incorporating therewith small quantities of other substances capable of acting as promoters. Suitable promoters which also act to repress dehydration during the dehydrogenation are alkalies and alkaline -alkali- and alkaline earth-metal compounds.

A particularly suitable catalyst for use in the execution of our invention essentially comprises or may consist of brass. The term "brass" is intended to include all alloys of zinc and copper or these metals and additional materials. Copper and zinc, severally, as well as together are very active catalytic materials. The use of zinc alone is, however, impractical in some cases due to its low melting point. Alloys of zinc with copper possess a sufficiently high melting point and an activity greater than that of zinc and copper alone. Brass catalysts are particularly suitable in the conversion of aliphatic monohydric secondary alcohols to the corresponding ketones at pressures of from about 2 to about 100 atmospheres.

In general, the specific catalyst to be used in any particular operation is chosen with respect to the material treated and the desired temperature, pressure and space velocity of operation so as to permit reaction at a practical rate while substantially obviating undesirable side reactions as dehydration, condensation, polymerization and the like of reactants and/or products.

The temperature of operation will be dependent upon the alcohol treated, the activity of the catalyst, the contact time, the stability of the treated material and products, and to a certain extent upon the pressure in the system. In the dehydrogenation of aliphatic primary and secondary alcohols we preferably employ temperatures of from about 400° C to about 600° C., but higher or lower temperatures may be used. Temperatures in the above range are particularly suitable when a brass catalyst is used.

The process is executed under pressures substantially greater than atmospheric. In general, it is not practical to operate at pressures below about 2 atmospheres absolute. Generally, there is no material advantage in using pressures much in excess of about 100 atmospheres due to the increased cost of reaction and recovery equipment capable of withstanding higher pressures. The advantages of our process are clearly apparent when the process is executed at pressures of from about 2 to 10 atmospheres.

The alcohol or alcohol mixture treated may contain considerable quantities of relatively inert diluent materials without deleteriously affecting the rate or efficiency of the operation. The alcohols treated need not be free of water. For example, the constant boiling mixtures of the alcohols with water may be treated without resorting to the separation of water therefrom.

The catalytic material in the desired physical form or deposited on a suitable inert carrier is employed in manners customary in catalytic processes of this type. The required amount of the catalytic material may be packed into a reaction chamber of any suitable material and the catalyst mass heated to and maintained at the desired temperature while alcohol is passed into contact therewith, under a substantial super-atmospheric pressure, at the desired rate. The effluent materials while under pressure may be conducted to a condensing coil, cooled by suitable means, wherein a large part of the condensable materials as the aldehydic or ketonic products and the unreacted alcohol are separated from the hydrogen produced. The hydrogen may then be discharged from the system and utilized for any desired purpose, or said hydrogen issuing from the condenser may be treated with a suitable solvent for the carbonylic compound, while maintaining the pressure, for example, in a scrubbing tower, for further recovery of the organic materials from the hydrogen. Suitable solvents include water, hydrocarbons, alcohols, etc. In some cases, the hydrogen may be scrubbed with the alcohol to be treated and the scrubbing liquid containing the aldehyde or ketone conducted to the reaction chamber and utilized therein. The product may be recovered from the solvent by any suitable means as by distillation. If any unreacted alcohol is present in the condensate obtained in the initial cooling of the effluent material from the reaction chamber, it may be recovered from the product by any suitable means, as by distillation, and reutilized. If desired, the recovered alcohol may be recirculated, thus providing a continuous process in which the alcohol is substantially totally converted to the aldehyde or ketone.

The following specific examples are introduced for the purpose of illustrating preferred modes and conditions of execution of the invention. It is to be understood that it is not our intention to limit the invention to the specific catalysts and alcohols employed nor to the operating conditions described.

Example I

The dehydrogenation of isopropyl alcohol to acetone was effected by subjecting the vapors of the substantially anhydrous alcohol to the action of a brass catalyst in a heated reaction vessel. The alcohol was evaporated and the vapors preheated prior to their introduction into the reaction vessel.

Runs were made at pressures of about atmospheric and at about 48–50 lbs./sq. in. under substantially the same conditions of temperature (about 500° C.) and throughput. The effect of the increase of pressure on the conversion is shown in the following table:

| Run number | I | II |
|---|---|---|
| Pressure (lbs./sq. in.) | 15 | 48–50 |
| Conversion per cent | 82 | 85 |

When the dehydrogenation was effected under substantially the same temperature and a pressure of about 98–100 lbs./sq. in., the conversion was substantially the same as in Run 2.

The materials leaving the reaction vessel were passed into a condenser and a part of the acetone and the isopropyl alcohol were separated from the hydrogen by condensation. The condensate was distilled for recovery of the acetone. The quality of the acetone obtained in each run was substantially the same. The unreacted isopropyl alcohol was reutilized.

It was found that when the condensation of the materials issuing from the reaction tube was effected under pressures of about 50–100 lbs./sq. in. a greater amount of the acetone and isopropyl alcohol was recovered.

Example II

Isopropyl alcohol was dehydrogenated by passing it into contact with a brass catalyst packed in a heated reaction vessel. The reaction vessel was in communication with a water cooled condenser coil wherein the material leaving the reaction vessel was passed and condensation effected at a temperature of about 12° C. and under substantially the same pressure at which the dehydrogenation was effected. The first run was made at a pressure of about 45 lbs./sq. in. (gauge), and the second run was made at about atmospheric pressure for purposes of comparison. The temperature in each run being about 500° C. The following table lists the pertinent data of these runs:

| Run number | 1 | 2 |
|---|---|---|
| Pressure in system lbs./sq. in. (gauge) | 45 | 6 |
| Acetone produced gals./hr | 7.85 | 8.56 |
| Acetone and alcohol condensed in primary condenser % of total | 98.0 | 92.2 |

In the above-described comparative experiments, the primary condenser was operated at a temperature of about 12° C. At this temperature, the condensate in Run 1 (45 lbs./sq. in.) was about 98.0% of the total, while in Run 2 (6 lbs./sq. in.) only 92.2%. When the condenser is operated under conditions more nearly approximating those encountered in commercial practice, for example, at a temperature of about 30° C., the advantages of effecting the condensation under elevated pressures are still more apparent. If the temperature in the condenser is about 30° C. and the pressure about atmospheric, about 41.6% of the condensable material will condense in the primary condenser. When the pressure is increased to about 3 atmospheres absolute, the temperature remaining substantially the same, about 86% of the condensable material is collected in the condenser.

While the invention has been described with particular reference to the dehydrogenation of isopropyl alcohol to acetone, it is to be understood that the principles of the invention are broadly applicable to the dehydrogenation of the primary and secondary alcohols. For example, the advantages of operating under pressures substantially greater than atmospheric are clearly apparent when secondary butyl alcohol is dehydrogenated to methyl ethyl ketone, when isobutyl alcohol is dehydrogenated to isobutyraldehyde, etc.

While we have described our invention in a detailed manner and provided specific examples illustrating modes of executing the same, it is to be understood that modifications may be made and that no limitations other than those imposed by the scope of the appended claims are intended.

We claim as our invention:

1. A process for the production of a dehydrogenation product of an alcohol which comprises contacting a monohydric alcohol of the class consisting of primary alcohols containing at least three carbon atoms and secondary alcohols with a dehydrogenation catalyst containing at least one heavy metal selected from Groups 1, 2, 7 and 8 of the Periodic System at a temperature favorable to dehydrogenation but below the temperature at which substantial dehydration occurs and under a pressure not substantially less than two atmospheres but below the pressure at which substantial condensation occurs.

2. A process for the production of a dehydrogenation product of an alcohol which comprises contacting a monohydric alcohol of the class consisting of primary alcohols containing at least three carbon atoms and secondary alcohols with a dehydrogenation catalyst essentially comprising a heavy metal selected from Groups 1, 2, 7 and 8 of the Periodic System under a pressure of from about 2 atmospheres to about 100 atmospheres and a temperature favorable to dehydrogenation but below the temperature at which substantial dehydration occurs.

3. A process for the production of a dehydrogenation product of an alcohol which comprises contacting a monohydric alcohol of the class consisting of primary alcohols containing at least three carbon atoms and secondary alcohols with a dehydrogenation catalyst essentially comprising a heavy metal selected from Groups 1, 2, 7 and 8 of the Periodic System at a temperature greater than about 400° C. but below the temperature at which substantial dehydration occurs and a pressure not substantially less than two atmospheres but below the pressure at which substantial condensation occurs.

4. A process for the production of a dehydrogenation product of an alcohol which comprises contacting a monohydric alcohol of the class consisting of primary alcohols containing at least three carbon atoms and secondary alcohols with a dehydrogenation catalyst essentially comprising copper and zinc at a pressure not substantially less than two atmospheres and at a temperature at which dehydrogenation occurs while substantial dehydration is avoided.

5. A process for the production of a dehydrogenation product of an alcohol which comprises contacting a monohydric alcohol of the class consisting of primary alcohols containing at least three carbon atoms and secondary alcohols with a dehydrogenation catalyst consisting essentially of alloyed copper and zinc at a pressure not substantially less than two atmospheres and a temperature greater than about 400° C. but below the temperature at which substantial dehydration occurs.

6. A process for the production of a dehydrogenation product of an alcohol which comprises contacting a monohydric alcohol of the class consisting of primary alcohols containing at least three carbon atoms and secondary alcohols with a dehydrogenation catalyst consisting essentially of alloyed copper and zinc at a pressure not substantially less than two atmospheres and a temperature of from about 400° C. to about 600° C.

7. A process for the production of a dehydrogenation product of an alcohol which comprises contacting a monohydric alcohol of the class consisting of primary alcohols containing at least three carbon atoms and secondary alcohols with a dehydrogenation catalyst consisting essentially of alloyed copper and zinc at a pressure of from about 2 to about 100 atmospheres and a temperature greater than about 400° C. but below the temperature at which substantial dehydration occurs.

8. A process for the production of an aldehyde which comprises contacting the vapors of a monohydric primary alcohol containing at least three carbon atoms with a dehydrogenation catalyst essentially comprising alloyed copper and zinc at a pressure not substantially less than two atmospheres and a temperature at which dehydrogenation occurs while dehydration is substantially avoided.

9. A process for the production of a ketone which comprises contacting the vapors of a monohydric secondary alcohol with a dehydrogenation catalyst consisting essentially of alloyed copper and zinc at a pressure not substantially less than two atmospheres and an elevated temperature at which the dehydrogenation occurs while dehydration of the alcohol is substantially obviated.

10. A process for the production of a ketone which comprises contacting the vapors of a monohydric secondary alcohol with a dehydrogenation catalyst consisting essentially of alloyed copper and zinc at a pressure of from about 2 to about 100 atmospheres and a temperature of from about 400° C. to about 600° C.

11. A process for the production of acetone which comprises contacting the vapors of isopropyl alcohol with a dehydrogenation catalyst essentially comprising a zinc-copper alloy at a temperature of from about 400° C. to about 600° C. and a pressure not substantially less than two atmospheres.

12. A process for the production of acetone which comprises contacting the vapors of isopropyl alcohol with a dehydrogenation catalyst essentially comprising a zinc-copper alloy at a temperature of from about 400° C. to 600° C. and a pressure of from 2 to about 100 atmospheres.

13. A process for the production of methyl ethyl ketone which comprises contacting the vapors of secondary butyl alcohol with a dehydrogenation catalyst essentially comprising a zinc-copper alloy under a pressure not substantially less than two atmospheres and a temperature greater than about 400° C. but below the temperature at which substantial dehydration occurs.

14. A process for the production of a dehydrogenation product of an alcohol which comprises contacting a monohydric alcohol of the class consisting of primary alcohols containing at least three carbon atoms and secondary alcohols with a dehydrogenation catalyst essentially comprising a heavy metal selected from Groups 1, 2, 7 and 8 of the Periodic System at a pressure not substantially less than two atmospheres and a temperature favorable to dehydrogenation but below the temperature at which substantial dehydration occurs, and subsequently cooling the treated material under a pressure not substantially less than two atmospheres to separate a major part of the condensable materials from the hydrogen formed.

15. A process for the production of a dehydrogenation product of an alcohol which comprises contacting a monohydric alcohol of the class consisting of primary alcohols containing at least three carbon atoms and secondary alcohols with a dehydrogenation catalyst essentially comprising a heavy metal selected from Groups 1, 2, 7 and 8 of the Periodic System at a pressure not substantially less than two atmospheres and a temperature favorable to dehydrogenation but below the temperature at which substantial dehydration occurs, subsequently cooling the treated material under a pressure not substantially less than two atmospheres to separate a major part of the condensable materials from the hydrogen formed, and then treating said hydrogen, while substantially maintaining the pressure, with a suitable solvent for the substantially complete removal of organic materials therefrom.

16. A process for the production of a dehydrogenation product of an alcohol which comprises contacting a monohydric alcohol of the class consisting of primary alcohols containing at least three carbon atoms and secondary alcohols with a dehydrogenation catalyst essentially comprising a zinc-copper alloy at a temperature greater than about 400° C. but below the temperature at which substantial dehydration occurs, subsequently cooling the treated material to separate at least a part of the organic material from the hydrogen produced, and then treating said hydrogen with a suitable solvent for the substantially complete removal of the organic material therefrom, said process being executed while a pressure not substantially less than two atmospheres is maintained throughout the system.

17. A process for the production of acetone which comprises contacting the vapors of isopropyl alcohol with a dehydrogenation catalyst essentially comprising a zinc-copper alloy at a temperature of from about 400° C. to about 600° C., subsequently cooling the treated material for separation of at least a part of the acetone from the formed hydrogen by condensation, and then treating said hydrogen with a solvent for the acetone to effect substantially complete removal of the acetone therefrom, said process being executed while maintaining a pressure not substantially less than two atmospheres in the system.

18. A process for the production of acetone which comprises contacting the vapors of isopropyl alcohol with a dehydrogenation catalyst essentially comprising a zinc-copper alloy at a temperature of from about 400° C. to about 600° C., subsequently cooling the treated material for separation of at least a part of the acetone from the formed hydrogen by condensation, and then treating said hydrogen with water for substantially complete removal of the acetone therefrom, said process being executed while maintaining a pressure of from about 2 to about 100 atmospheres in the system.

19. In a process for the production of a dehydrogenation product of a monohydric alcohol of the class consisting of primary alcohols containing at least three carbon atoms and secondary alcohols, the step which comprises cooling the treated reaction mixture under a pressure not substantially less than two atmospheres for removal of a major portion of the organic materials therefrom by condensation.

20. In a process for the production of a dehydrogenation product of a monohydric alcohol of the class consisting of primary alcohols containing at least three carbon atoms and secondary alcohols, the step which comprises cooling the treated reaction mixture under a pressure not substantially less than two atmospheres for removal of a major portion of the organic materials therefrom by condensation, and subsequently treating the hydrogen leaving the condenser stage with a solvent for the organic material, under not substantially less than two atmospheres, to substantially completely remove the remainder of the organic material therefrom.

LEO V. STECK.
WILLIAM ENGS.
MARTIN DE SIMÓ.